United States Patent [19]

Otaki et al.

[11] Patent Number: 5,687,416
[45] Date of Patent: Nov. 11, 1997

[54] PHOTOGRAPHIC APPARATUS WITH SELECTABLE PHOTOMETRIC OPTICAL SYSTEMS

[75] Inventors: Tatsuro Otaki, Tokyo; Chikaya Iko, Yokohama, both of Japan

[73] Assignee: Nikon Corporation, Tokyo, Japan

[21] Appl. No.: 667,601

[22] Filed: Jun. 21, 1996

[30] Foreign Application Priority Data

Jun. 23, 1995 [JP] Japan .................... 7-180875

[51] Int. Cl.$^6$ .................... G03B 17/48
[52] U.S. Cl. .................... 396/432
[58] Field of Search .................... 396/270, 274, 396/432

[56] References Cited

U.S. PATENT DOCUMENTS 3,827,811  8/1974  Kato et al. .
5,555,070  9/1996  Hermann .................... 396/432 X Primary Examiner—Howard B. Blankenship
Attorney, Agent, or Firm—Foley and Lardner

[57] ABSTRACT

The present invention relates to a photographic apparatus comprising a photometric system which can tolerate a wide range of change in contrast. This photographic apparatus attains, at least, a state in which an image from an optical instrument such as microscope can be photographed and a state in which the light intensity of the image formed by the optical instrument can be measured by the photometric system utilizing a light separated from incident light. This photometric system comprises a plurality of optical systems respectively having magnifications different from each other and a photosensor having a light receiving surface defined by a plurality of light intensity detectors, wherein these plurality of optical systems and plurality of detectors are intentionally selected so as to change the range of measurement of an image formed on the light receiving surface of the photosensor.

11 Claims, 7 Drawing Sheets

PHOTOGRAPHIC APPARATUS WITH SELECTABLE PHOTOMETRIC OPTICAL SYSTEMS

BACKGROUND OF THE INVENTION

1. Field of the Invention

The present invention relates to a photographic apparatus applicable to optical instruments such as microscope and, in particular, relates to a photometric system for determining a shutter speed in the photographic apparatus.

2. Related Background Art

In the conventional photometric systems attached to optical instruments such as microscope, the illuminance of an image of an object formed by an objective lens is measured so as to determine exposure time. In this case, it is necessary to control a shutter speed (defined by a turnaround time from opening to closing of a shutter) with reference to the sensitivity (ISO value) of a film disposed on an imaging surface. In the photographic recording in conjunction with a microscope, in particular, unlike still cameras, there is no aperture stop for changing the exposure condition. Therefore, the exposure control is mainly performed by adjusting the shutter speed with reference to the film sensitivity. Accordingly, in such a specific photographic apparatus, a desired photograph cannot be taken unless the shutter speed is appropriately controlled.

SUMMARY OF THE INVENTION

In general, the exposure time (shutter speed) is determined as a formed image is subjected to photometry by means of a photoelectric converter (included in a photosensor). In particular, the above-mentioned photometry comprises the steps of separating a part of light directed toward the imaging surface on which the film is disposed and then making thus separated light form an image on a light receiving surface of the photoelectric converter. In such a conventional photometric system, the exposure time can be determined for a general sample, whose brightness does not relatively fluctuate, when the relationship between the photometric value thereof and an optimal exposure time at that photometric value is determined beforehand.

However, such a state may differ from that in observation and photographic recording by drop fluorescence technique which has become a common practice in recent years. Namely, in the drop fluorescence technique, a highlighted object (sample) is seen in a dark background. Accordingly, when the sample to be observed is a sample for the drop fluorescence technique, it has been remarkably difficult to determine the exposure since the difference in contrast within the observed image is large.

Accordingly, the object of the present invention is to provide a photographic apparatus equipped with a photometric system which can tolerate a wide range of change in contrast.

The photographic apparatus according to the present invention realizes, at least, a state in which an image from an optical instrument such as microscope can be photographed and a state in which light intensity of the image formed by the optical instrument can be measured by the photometric system utilizing a light separated from incident light. This photometric system comprises a plurality of optical systems respectively having magnifications different from each other and a photosensor (including a photoelectric converter) having a light receiving surface defined by a plurality of light intensity detectors, wherein these plurality of optical systems and plurality of detectors are intentionally selected so as to change the range of measurement of an image formed on the light receiving surface.

In particular, as shown in FIGS. 1, 4, and 5, the photographic apparatus according to the present invention comprises a housing 101 which is used for defining a dark room and has an opening 103 for guiding incident light from a predetermined optical system (for example, an objective lens 21 of a microscope in an embodiment in this specification) into the housing 101; a shutter 11 accommodated in the housing 101 and placed in a first light path of the incident light; a separator (for example, a prism assembly 5 in the embodiment in this specification) for separating a part of the incident light from the incident light traveling through the first light path; and a photometric system which is accommodated within the housing 101 and measures an illuminance of an image formed by the optical system 21 by using the light separated by the separator 5.

The photographic apparatus according to the present invention further comprises a moving mechanism for changing a position at which the separator 5 is disposed. This moving mechanism is accommodated within the housing 101 and sets the separator 5 to at least one of a first position (position shown in FIG. 1 at which the separator 5 is disposed) in the first light path of the incident light between the opening 103 of the housing 101 and the shutter 11 and a second position (position shown in FIG. 4 at which the separator 5 is disposed) deviated from the first light path of the incident light. When the moving mechanism changes the position at which the separator 5 is disposed, at least a state in which an image from an optical instrument such as microscope can be photographed (state in which the separator 5 is disposed at the second position as shown in FIG. 4) and a state in which light intensity of the image formed by the optical instrument can be measured by the photometric system utilizing the light separated from the incident light (state in which the separator 5 is disposed at the first position as shown in FIG. 1) are realized.

The above-mentioned photometric system comprises a photosensor 8 for detecting the intensity of the light component separated by the separator 5; a plurality of photometric optical systems (a first photometric optical system 6a and a second photometric optical system 6b in the embodiment in this specification) which have magnifications different from each other and used for making the separated light form an image on a light receiving surface 7 of the photosensor 8; and a switching mechanism for selectively setting one of the plurality of photometric optical systems 6a and 6b into a second light path of the separated light between the separator 5 disposed at the first position and the light receiving surface 7 of the photosensor 8. In particular, the photosensor 8 has a plurality of light intensity detectors 8a constituting the light receiving surface 7 thereof; while each light intensity detector 8a detects, at its corresponding area, the light intensity of the image formed on the light receiving surface 7 (see FIG. 2). By intentionally selecting these plurality of optical systems 6a and 6b and plurality of detectors 8a, the photometric system changes the range of measurement for the image formed on the light receiving surface 7.

On the other hand, unlike still cameras, the photographic apparatus according to the present invention does not have an aperture stop. Also, as a characteristic configuration of this photographic apparatus (see FIG. 4), an opening area 111a defined by an opening 111 of the shutter 11 has a maximum area smaller than an imaging area 30 attained when the incident light forms an image on the imaging surface (e.g., film surface).

The above-mentioned photometric system further comprises a control unit 9 which determines the shutter speed defined by a turnaround time from opening to closing of the shutter 11 on the basis of light intensity information obtained from the photosensor 8 and information about sensitivity of a photosensitive material (e.g., ISO value of a film) disposed on the imaging surface. By controlling the shutter speed by means of this control unit 9 instead of the above-mentioned aperture stop, the photographic apparatus controls the exposure.

Also, a side wall of the housing 101 is provided with an adapter 102 for attaching thereto a finder optical system 150 for observing an image which is formed by the predetermined optical system 21 via the separator 5 disposed at the first position.

According to the foregoing configuration, in the present invention, a plurality of the photometric optical systems respectively having magnifications different from each other are switched from each other by the switching mechanism, thereby images with different magnifications are formed on the light receiving surface of the photosensor. That is, in any of the case where an image to be recorded is subjected to an average photometry in a wide area and the case where, as in the case of fluorescent samples, only a small part of the image is subjected to photometry, an appropriate exposure time can be determined when the photometric optical systems having different magnifications are switched from each other.

Further, in the configuration in which the photosensor can detect the light intensity of the image formed on the light receiving surface thereof at each of two-dimensionally divided areas, a more appropriate exposure time can be determined on the basis of the light intensity at each area or a value obtained when the light intensity at each area is processed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
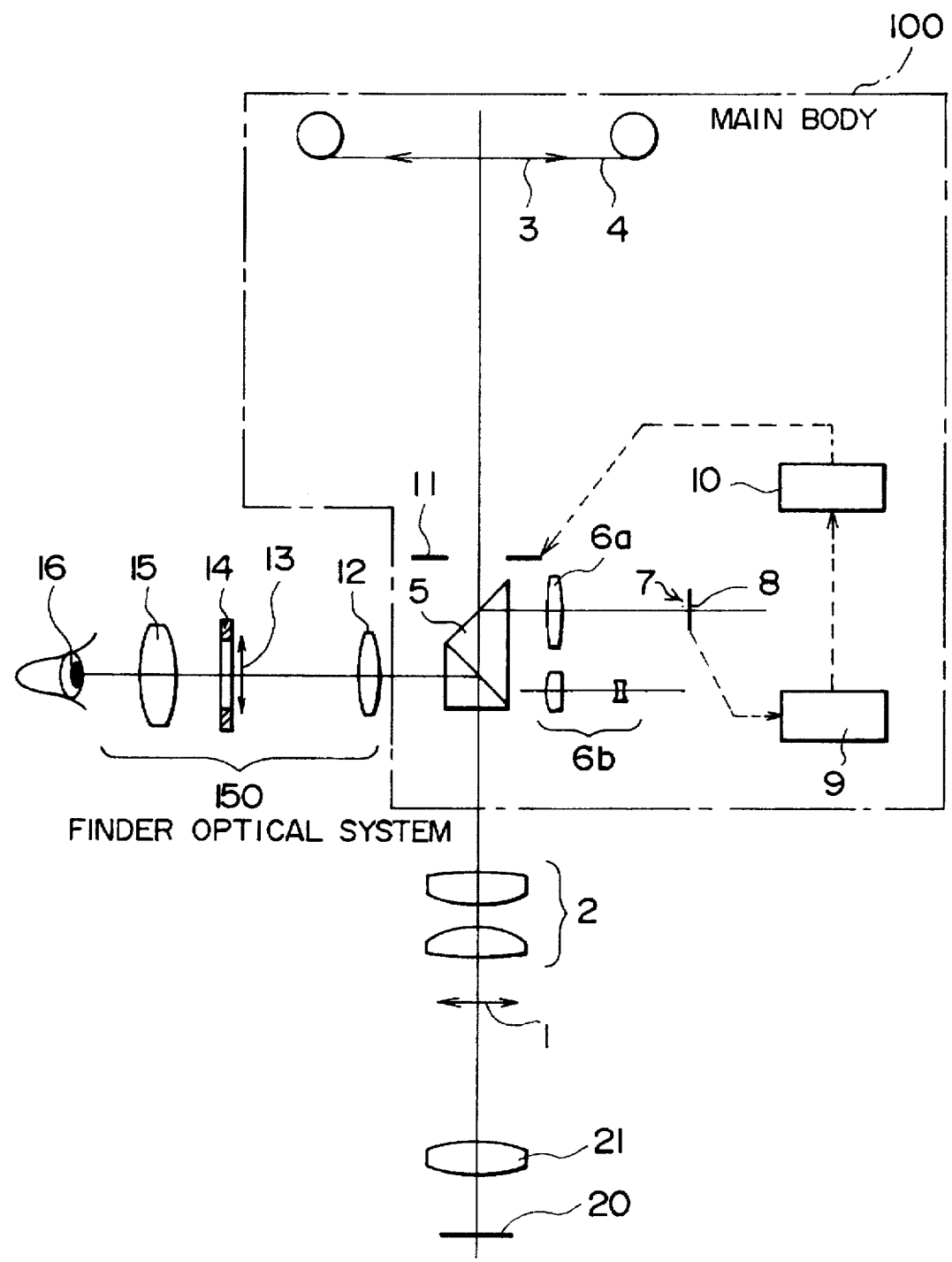
FIG. 1 is a view schematically showing a configuration of an embodiment of the photographic apparatus according to the present invention.

FIG. 1 shows a configuration of an embodiment of the photographic apparatus according to the present invention. Light from a sample 20 under microscopic observation is converged by an objective lens 21, thereby an image 1 is formed on a predetermined plane. The image 1 is further enlarged by a photographic lens 2 (having an enlarging magnification) so as to form an enlarged image 3. A film 4 is disposed at the position of the enlarging image 3 (imaging surface), thereby the image 1 is photographed as the enlarged image 3. Between the photographic lens 2 and the film surface (imaging surface) on which the enlarged image 3 is formed, a prism assembly 5, as a separator, is detachably inserted. At the time of photometry, the prism assembly 5 is inserted into the light path of the incident light and functions to introduce parts of the luminous flux from the photographic lens 2 into a photometric optical system 6a or 6b (each having a reducing magnification) and a finder optical system 150 respectively. At the time of photographing, by contrast, this prism assembly 5 is moved by a predetermined mechanism so as to deviate from the photographing light path (optical path through which the incident light proceeds toward the imaging surface).

In the photometric system, the first photometric optical system (including the photometric lens 6a) and the second photometric optical system (including the photometric lens 6b) are disposed so as to be switchable from each other, thereby a photometric image 7 is formed on a light receiving surface of a multi-point sensor 8, which is a photosensor, by the one of these photometric lenses 6a and 6b selected. Namely, the multi-point sensor 8 is placed, at the surface on which the photometric image 7 is formed, such that this surface coincides with the light receiving surface thereof. In this embodiment, the photometric lens 6a makes about 35% of the enlarged image 3 incident on the multi-point sensor 8. By contrast, the photometric lens 6b makes about 3.5% of the enlarged image 3 incident on the multi-point sensor 8.

Figure 2:
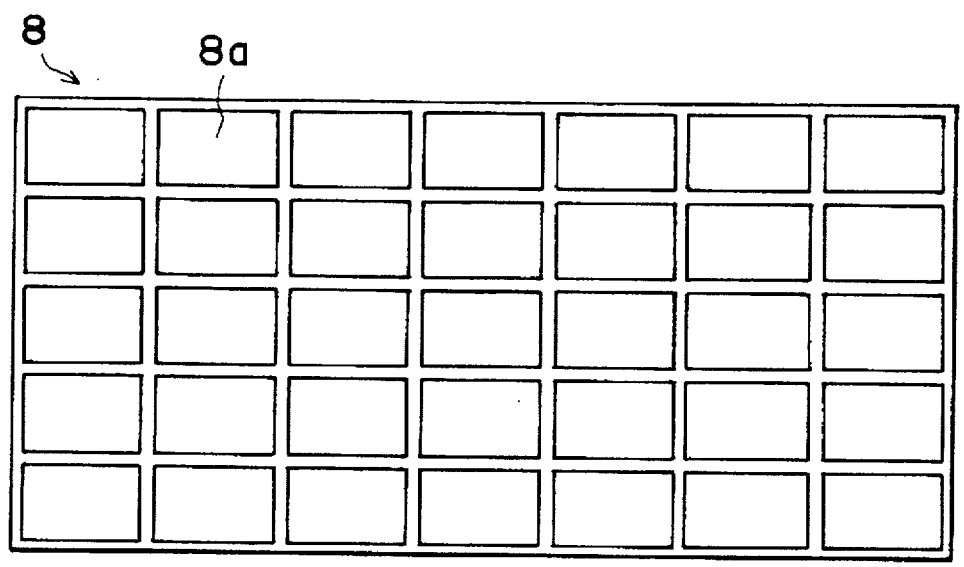
FIG. 2 is a schematic plan view showing a multi-point sensor as a photosensor applicable to the photographic apparatus according to the present invention.
Figure 3:
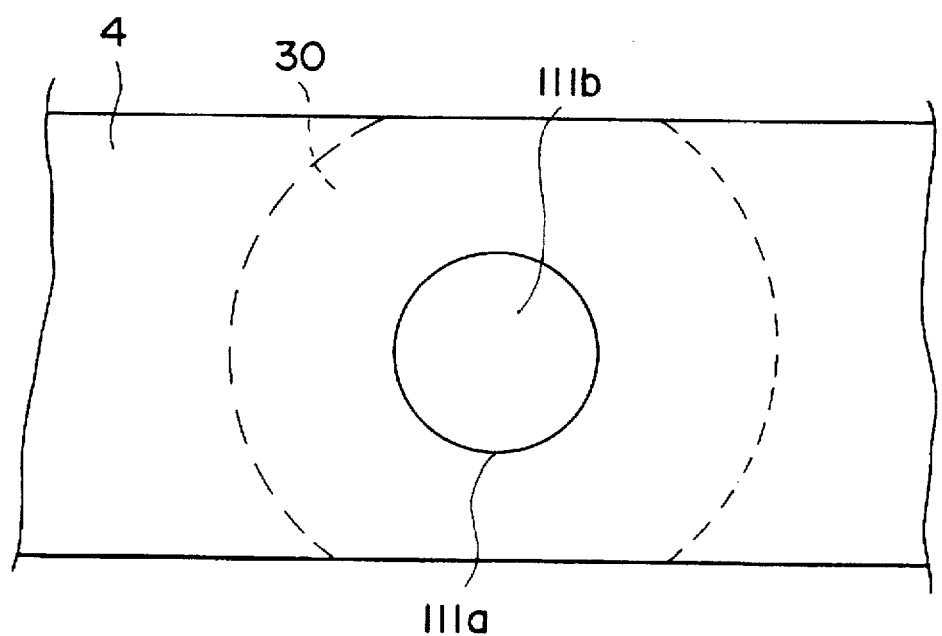
FIG. 3 is a view explaining a relationship between the opening area of a shutter and the imaging area on a film in the photographic apparatus according to the present invention.

As shown in FIG. 2, the light receiving surface of the multi-point sensor 8 is constituted by an array of a plurality of photodiodes 8a. Accordingly, photometry can be effected in each area of the light receiving surface. In the multi-point sensor 8 of this embodiment, its light receiving surface is constituted by an array consisting of 5×7=35 pieces of photodiodes, while a light intensity signal from each photodiode 8a is transmitted to a control unit 9.

Based on the light intensity signal from each photodiode 8a, sensitivity information (ISO value) of the film 4, information about a range of photometry indicated beforehand, and the like, the control unit 9 determines a shutter speed of a shutter 11. Based on this shutter speed, a shutter driver 10 controls the opening and closing of the shutter 11.

In the photographic apparatus according to the present invention, unlike typical still cameras having an aperture stop for changing exposure condition, the above-mentioned control unit 9 controls the exposure condition by controlling the shutter speed. Also, the maximum area of an opening area 111a defined by an opening 111 of the shutter 11 is smaller than an imaging area 30 on the imaging surface (film surface) on which the enlarged image 3 is formed.

Figure 4:
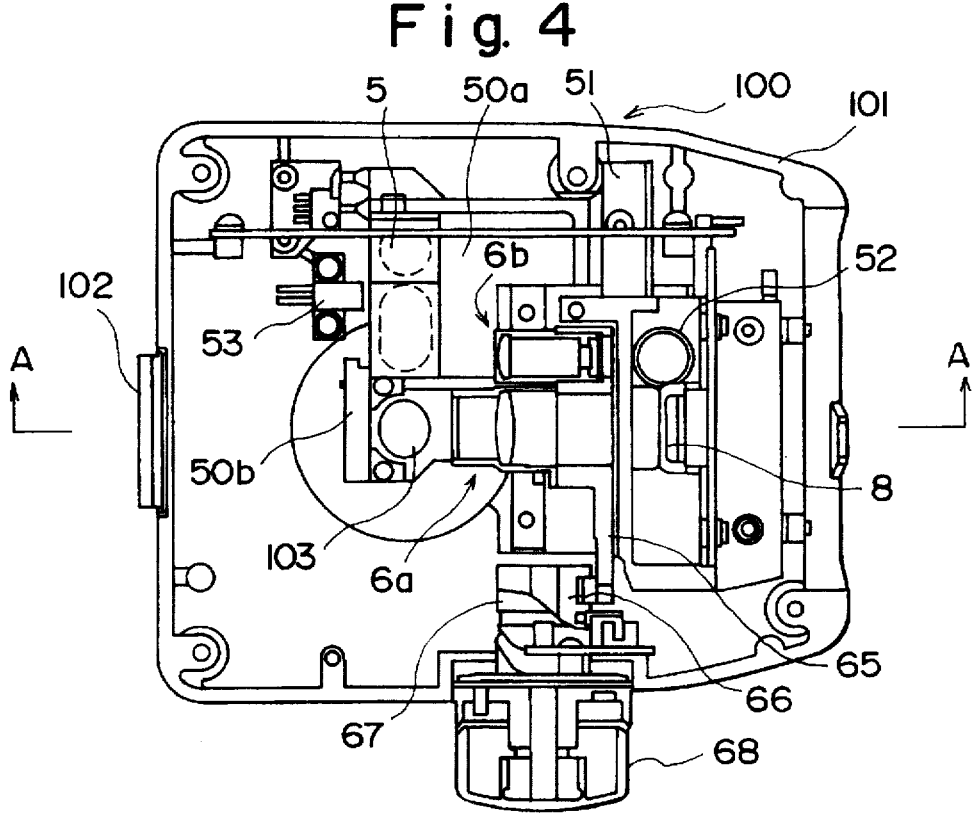
FIG. 4 is a plan view specifically showing an internal configuration of the photographic apparatus according to the present invention.
Figure 5:
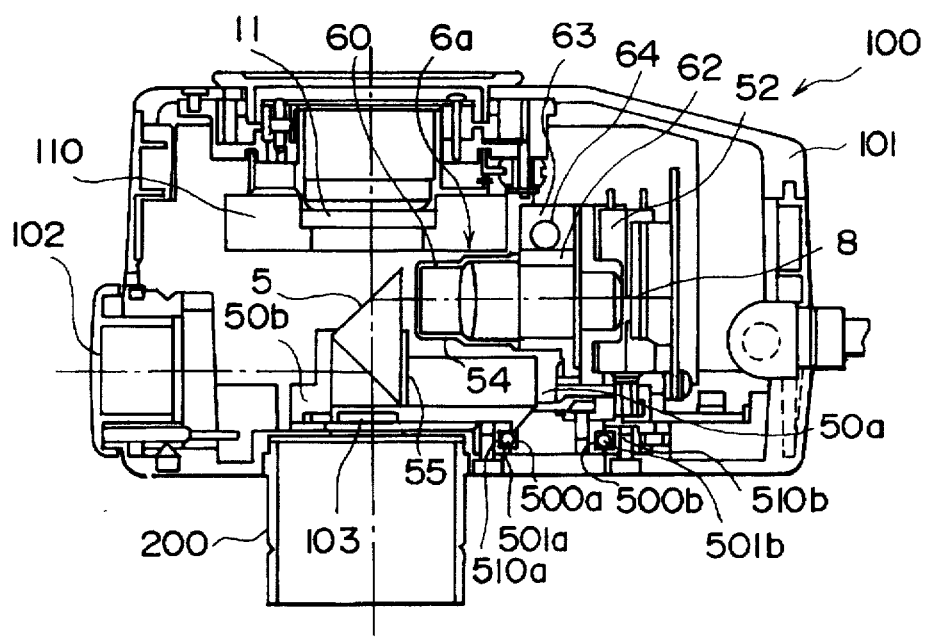
FIG. 5 is a cross-sectional view showing the internal configuration of the photographic apparatus of FIG. 4 along line A—A in FIG. 4.
Figure 6:
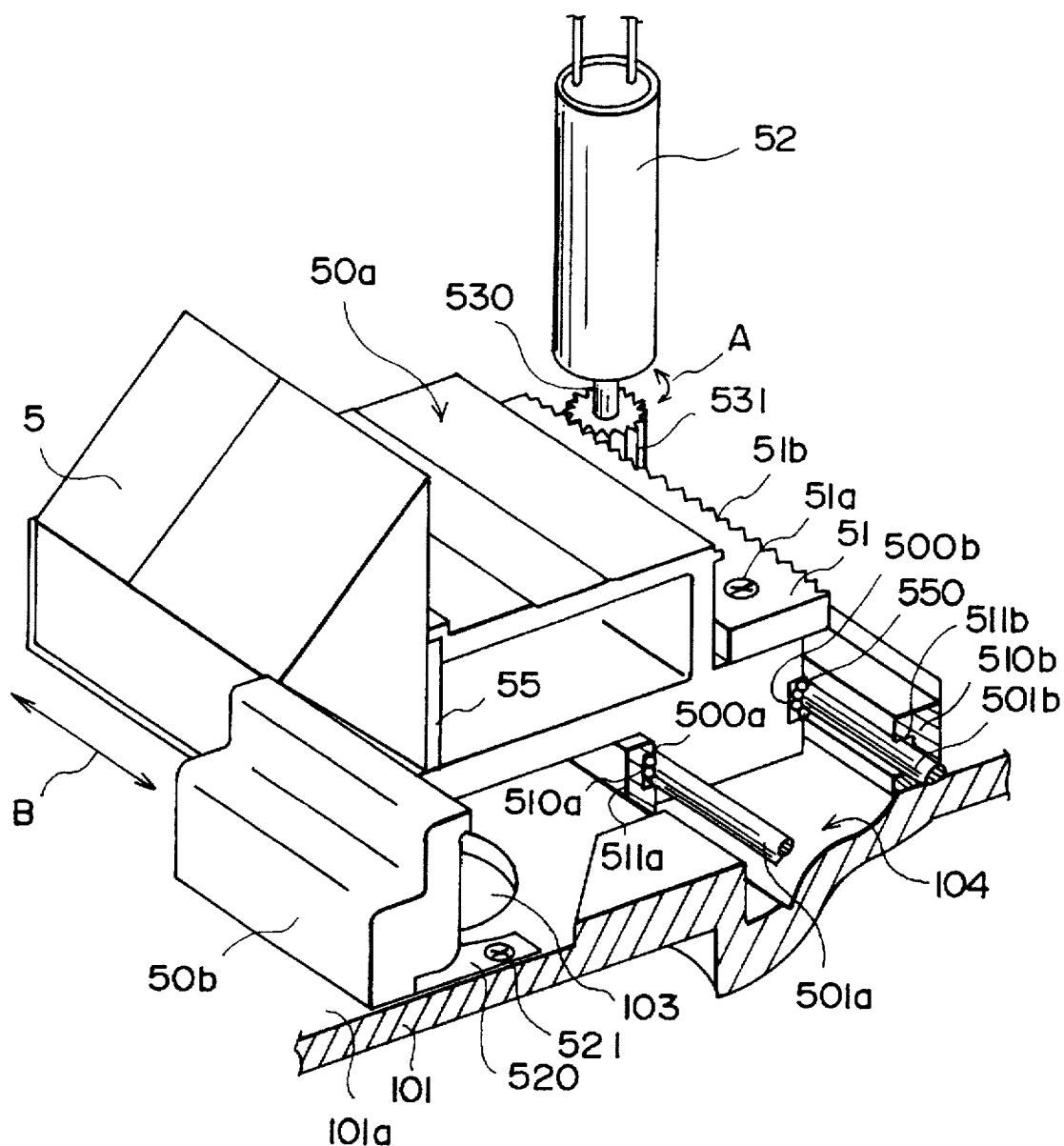
FIG. 6 is a perspective view showing a configuration of a moving mechanism for a prism assembly 5 in the photographic apparatus according to the present invention.
Figure 7:
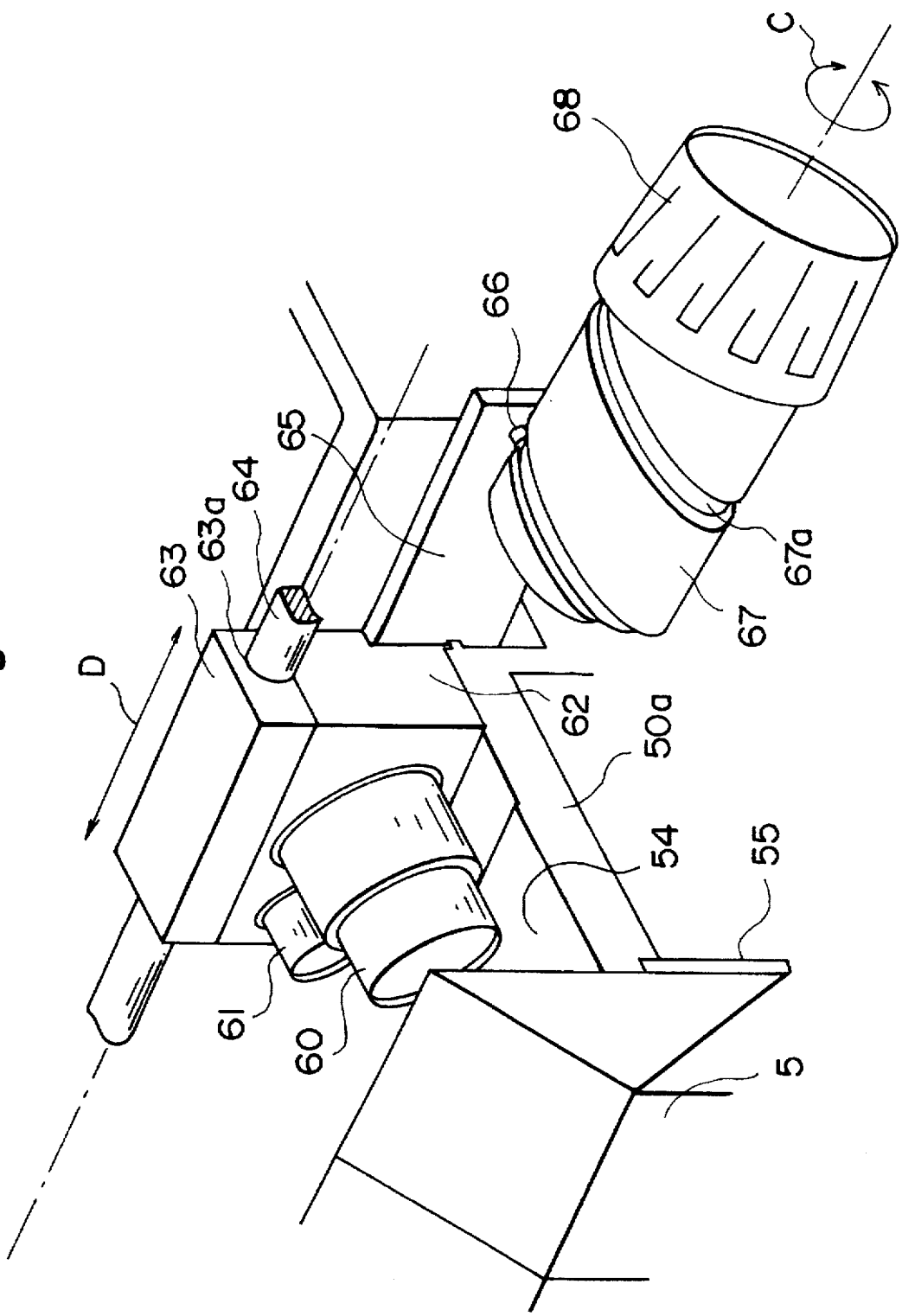
FIG. 7 is a perspective view showing a configuration of a moving mechanism in a switching mechanism for photometric optical systems in the photographic apparatus according to the present invention.

In the following, a specific configuration of the photographic apparatus according to the present invention will be explained with reference to FIGS. 4 to 7. Here, FIG. 4 is a plan view showing the inside of a main body 100 of the photographic apparatus observed from above the Cain body 100; FIG. 5 is a cross-sectional view showing the inside of the main body 100 of the photographic apparatus along line A—A in FIG. 4; FIG. 6 is a perspective view explaining a configuration of a moving mechanism for changing a position at which the above-mentioned prism assembly 5 (included in a separator) is disposed; and FIG. 7 is a perspective view explaining a configuration of a switching mechanism (included in the photometric system) for switching the above-mentioned plurality of photometric optical systems 6a and 6b from each other.

The main body 100 of the photographic apparatus has a housing 101 with an opening 103 for introducing light from an optical system of a microscope or the like thereinto. This housing 101 is equipped with a first adapter 102 for attaching thereto the finder optical system 150 for observing the image 1 formed by an optical instrument such as a microscope (including the objective lens 21 shown in FIG. 1), as well as the opening 103 for introducing the light from the microscope or the like (luminous flux from the sample 20) into the housing 101. Also, at a position corresponding to the position at which the opening 103 is formed, a second adapter 200 for attaching the main body 100 of the photographic apparatus to the microscope or the like is disposed. Here, the detachable photographic lens 2 having an enlarging magnification can be attached to the second adapter 200. Also, for example, as shown in FIG. 1, the finder optical system 150 includes a finder lens 12, a mask 14, and an eyepiece lens 15. An observer (naked eye 16) observes an observation image 13 which is formed by the finder lens 12 within the finder optical system 150 via the prism assembly 5.

As shown in FIG. 6, the moving mechanism of the prism assembly 5 comprises a first prism holder 50a to which the prism assembly 5 is fixed via a reinforcement 55, as well as a second prism holder 50b which holds the movable prism assembly 5 in cooperation with the first prism holder 50a. Here, the second prism holder 50b is fixed to a bottom surface 101a of the housing 101 by a bolt 521 via a metal plate 520.

In particular, the first prism holder 50a is provided with a guide section which is accommodated in a guide groove 104 which extends, on the bottom surface 101a of the housing 101, along the moving direction (direction indicated by arrow B) of the prism assembly 5. This guide section is also provided with first and second grooves 500a and 500b extending along the moving direction B. On the other hand, within the guide groove 104, first and second guide members 510a and 510b are disposed along the moving direction B, in addition to the above-mentioned guide section of the first prism holder 50a. For these guide members 510a and 510b, grooves 511a and 511b each extending along the moving direction B are provided, respectively.

In the space defined by the first groove 500a formed in the above-mentioned guide section of the first prism assembly 5 and the groove 511a formed in the first guide member 510a, a first guide pin 501a is supported while penetrating therethrough; whereas, in the space defined by the second groove 500b formed in the above-mentioned guide section of the first prism assembly 5 and the groove 511b formed in the second guide member 510b, a second guide pin 501b is supported while penetrating therethrough. Also, bearings 550 are accommodated in these spaces together with the first and second guide pins 501a and 501b, respectively, thereby contributing to smooth movement of the prism assembly 5.

The first prism holder 50a further comprises a driving mechanism for moving the holder itself. Namely, to the first prism holder 50a, a rack 51 provided with engaging grooves arranged with a predetermined pitch along the moving direction B is fixed by means of a bolt 51a. Also, this driving system includes a stepping motor 52 having a rotary shaft 530 with a pinion 531 attached to the front end thereof. This stepping motor 52 is disposed at a predetermined position within the housing 101 such that the pinion 531 and the rack 51 engage with each other. The rotary movement (movement in the direction indicated by arrow A in the drawing) of the rotary shaft 530 of the stepping motor 52 is converted, by way of the pinion 531 attached to the rotary shaft 530 and the rack 51, into a linear movement in the direction indicated by arrow B in the drawing.

The movement of the prism assembly 5 in the direction B is secured by the above-mentioned first and second guide pins 501a and 501b. Also, whether the prism assembly 5 is in the state where it is disposed at the first position in the light path of the light proceeding from the microscope or the like toward the film 4 or in the state where it is disposed at the second position deviated from the light path of the light is judged on the basis of information obtained from a detector such as a photointerrupter 53 (see FIG. 4).

As shown in FIG. 7, the switching mechanism for the photometric optical systems 6a and 6b comprises a supporting member 62 for supporting lens barrels 60 and 61 respectively accommodating the photometric optical systems 6a and 6b therein. This supporting member 62 is provided with a guide member 63 having a through hole 63a extending in the direction indicated by arrow D in the drawing, as well as a joint section 65 for connecting the supporting member 62 and a cam mechanism 67, which is a driving mechanism for this switching mechanism, to each other. Here, the guide member 63 supports a guide pin 64 for defining the moving direction D of the supporting member 62, while the guide pin 64 penetrates through the through hole 63a.

On the other hand, the cam mechanism 67, whose surface has a spiral cam groove 67a, is connected to a knob 68 which is disposed outside of the housing 101. Also, this cam mechanism 67 is disposed at a predetermined position within the housing 101 such that the cam groove 67a and a protrusion 66 provided with the joint section 65 engage with each other.

In the switching mechanism in this embodiment, the rotary movement (movement in the direction indicated by arrow C in the drawing) of the knob 68 is transmitted to the cam mechanism 67 connected to the knob 68 and then, by way of the protrusion 66 engaging with the cam groove 67, transmitted to the joint section 65. As a result, the rotary movement of the knob 68 is converted, by way of the joint section 65, to a substantially linear movement of the supporting member 62 indicated by arrow D in the drawing. The photometric optical systems 6a and 6b are supported along this moving direction of the supporting member 62.

Accordingly, the switching mechanism in this embodiment realizes switching of the photometric optical systems 6a and 6b by moving the supporting member 62 in the direction indicated by arrow D.

Here, the movement of the supporting member 62 in the direction D is secured by the guide pin 64 which has penetrated through the through hole 63a of the above-mentioned guide member 63. Also, while supporting each of the photometric optical systems 6a and 6b, the supporting member 62 moves so as to slide on an upper surface 54 of the first prism holder 50a. In this embodiment, the photometric system includes, at least, the plurality of photometric optical systems 6a and 6b, the switching mechanism, the multi-point sensor 8 (photosensor), and the control unit 9.

In the following, the operation (shutter speed determining algorithm) will be explained with reference to FIGS. 8 and 9.

Figure 8:
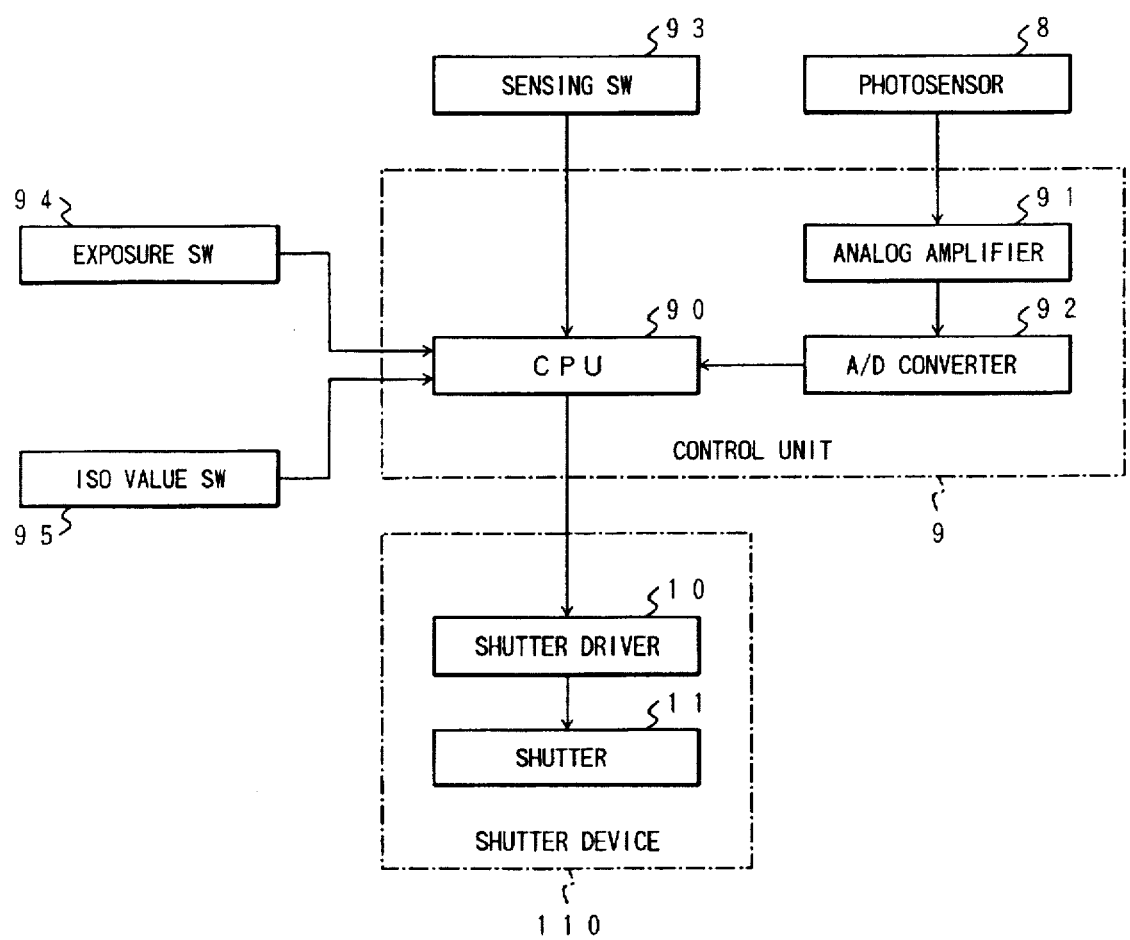
FIG. 8 is a block diagram showing a configuration of a control system which executes a shutter speed determining algorithm.
Figure 9:
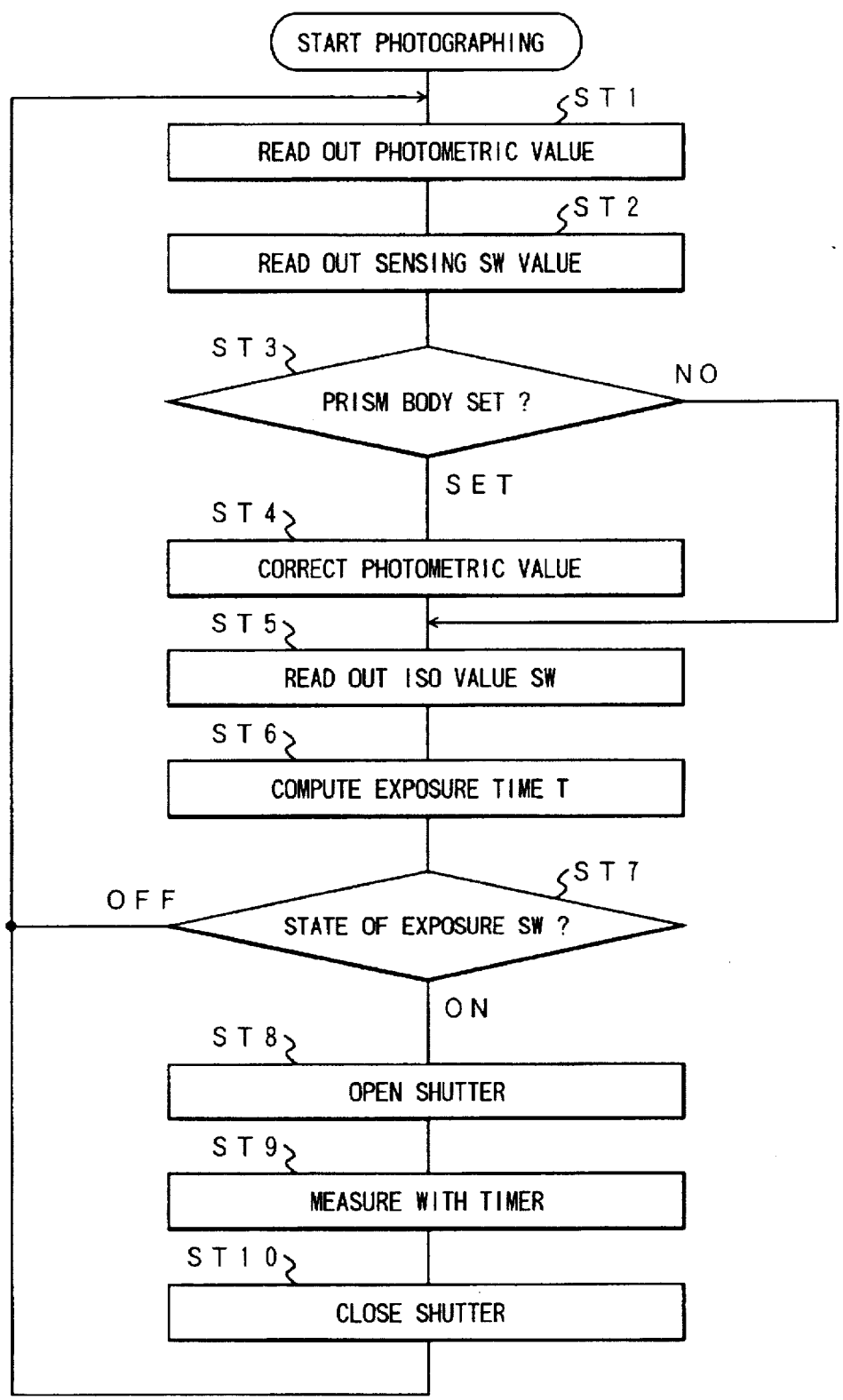
FIG. 9 is a flow chart for explaining a shutter speed determining algorithm executed in the control system shown in FIG. 8.

As shown in FIG. 8, to the control unit 9 in this embodiment, an ISO value switch 95 (indicated by SW in the drawing) for designating the sensitivity information (ISO value) of the film 4, an exposure switch 94 (indicated by SW in the drawing) for indicating the opening and closing of the shutter 11, a sensing switch 93 (including the photointerrupter 53 shown in FIG. 4, for example) for confirming a position of the prism assembly 5, and the photosensor 8 such as a multi-point sensor are electrically connected. Information from these interfaces is utilized for the control unit 9 to determine the exposure time (shutter speed) between opening and closing of the shutter 11. Also, this control unit 9 includes an analog amplifier 91 for amplifying the electric signal from the above-mentioned photosensor 8, an A/D converter for A/D-converting the signal from the analog amplifier 91, and a CPU 90 for executing the shutter speed determining algorithm.

When the exposure time is determined by the control unit 9 (CPU 90), the control unit instructs the shutter driver 10 on the opening and closing of the shutter 11 and, simultaneously, measures the exposure time. Here, these parts of the control unit 9, the shutter driver 10, and the shutter 11 constitute a shutter device 110.

In the control unit 9, the shutter speed may also be determined on the basis of the photometric value from any of the photodiodes 8a. Alternatively, the shutter speed may be determined on the basis of a mean value of the photometric values obtained from the photodiodes 8a, its maximum value, its minimum value, a value next to the maximum value, a value next to the minimum value, a value obtained when a standard variation is added to or subtracted from the mean value as it is, or a value obtained when a threefold standard variation is added to or subtracted from the mean value.

On the other hand, the finder optical system 150 is provided with the finder lens 12. At the position where the observation image 13 is formed by the finder lens 12, the mask 14 indicating the range of photographic recording is disposed. The observation image 13 and mask 14 are observed by the naked eye 16 via the eyepiece lens 15. Thus, the confirmation of the range of photographic recording and the focusing are effected by the finder optical system 150.

In the photometric system of this embodiment, 35% of the area of the enlarged image 3 can be observed when the photometric lens 6a is used at the time of photometry. Further, since the multi-point sensor 8 is constituted by an array of 35 pieces of photodiodes, each photodiode 8a can observe 1% of the area of the enlarged image. When the photometric lens 6b is used, on the other hand, 3.5% of the enlarged image can be observed, while each photodiode 8a can observe 0.1% of the area of the enlarged image. Accordingly, the microscopic image can be measured, while the areas of the enlarged image 3 respectively corresponding to 35%, 3.5%, 1%, and 0.1% of the enlarged image 3 are switched from each other upon the switching of the photometric lenses 6a and 6b and selecting of the photometric value within the control unit 9.

Specifically, the case where 0.1% of the area of the enlarged image 3 is subjected to photometry (referred to as "0.1% photometry" hereinafter) will be explained with reference to the flow chart of FIG. 9.

First (at step ST1), the CPU 90 reads out a photometric value which has been derived from the photosensor 8, amplified by the analog amplifier 91, and then A/D-converted by the A/D converter 92. Subsequently, it reads out (at step ST2) a value (electric signal) from the sensing SW 93 (photointerrupter 53) and then (at step ST3) confirms the state in which the prism assembly 5 is disposed. When it is judged that the prism assembly 5 is disposed in the light path of the incident light (at the first position), the photometric value which has been obtained as the illuminance in 0.1% of the area of the light receiving surface 7 of the photosensor 8 is corrected (step ST4).

Thereafter, the value of the ISO value SW 95 is read out (at step ST5), and then an appropriate exposure time T (shutter speed between the opening and closing of the shutter 11) is determined (at step ST6) on the basis of the photometric value which has been obtained beforehand and the above-mentioned ISO value.

Further (at step ST7), the CPU 90 judges the state (ON state or OFF state) of the exposure SW 94 on the basis of information (electric signal) from the exposure SW 94. Here, prior to this step ST7, it is necessary to confirm beforehand that the prism assembly 5 is disposed at the second position deviated from (the first position in) the light path of the incident light. When it is judged that the exposure SW 94 is in the ON state, the CPU 90 instructs the shutter driver 10 of the shutter device 110 to open the shutter 11 (at step ST8) and then starts measuring the exposure time (step ST9). After confirming that a predetermined exposure time has passed according to the time measurement at step ST9, the CPU 90 instructs the shutter driver 10 to close the shutter 11, thereby effecting a photographic recording (step ST10).

Therefore, in accordance with this embodiment, photometry can be performed with reference to objects, for example, such that 35% photometry is used when the sample 20 to be observed is a general sample while 0.1% photometry is used for a drop fluorescence sample. Also, in this embodiment, due to the use of the photodiode 8a instead of CCD, photometry with a favorable sensitivity utilizing the characteristics of the photodiode can be effected.

As explained in the foregoing, in accordance with the photometric system of the present invention, as the areas of the image formed on the photodetector are switched and, further, as the areas of the image detected at the photodetector are switched, photometry can be performed under a plurality of magnifications. Accordingly, even when objects have contrasts greatly different from each other, e.g., in the case of photographing a general sample and a drop fluorescence sample, which has conventionally been difficult; their photographs can be taken with appropriate exposures.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.180875/1995 filed on Jun. 23, 1995 is hereby incorporated by reference.

What is claimed is:

1. A photographic apparatus for guiding light incident thereon via a predetermined optical system to an imaging surface on which a photosensitive material is disposed, said photographic apparatus comprising:

a separator for separating a part of the incident light therefrom;

a moving mechanism for changing a position at which said separator is disposed, said moving mechanism setting said separator to at least one of a first position in a first light path of the incident light directed toward the imaging surface and a second position deviated from the first light path of the incident light;

a shutter disposed in the first light path of the incident light; and a photometric system for measuring an illuminance of the image formed by the predetermined optical system by using the separated light from said separator, said photometric system comprising:

a photosensor for detecting an intensity of the separated light from said separator;

a plurality of photometric optical Systems for making the separated light form an image on a light receiving surface of said photosensor, said photometric optical systems having magnifications different from each other; and a switching mechanism for selectively setting one of said plurality of photometric optical systems into a second light path of the separated light between said separator set to the first position and said light receiving surface of said photosensor.

2. A photographic apparatus according to claim 1, wherein said shutter has a maximum opening area which is smaller than an imaging area attained when the incident light forms the image on said imaging surface.

3. A photographic apparatus according to claim 1, wherein said photosensor comprises a plurality of light intensity detectors constituting said light receiving surface of said photosensor, each of said light intensity detectors detecting, at an area corresponding thereto, the light intensity of the image formed on said light receiving surface of said photosensor.

4. A photographic apparatus according to claim 1, wherein said photometric system further comprises a control unit for determining a shutter speed of said shutter on the basis of light intensity information obtained from said photosensor and information about sensitivity of the photosensitive material disposed on the imaging surface.

5. A photographic apparatus according to claim 1, wherein each of said photometric optical systems has a reducing magnification.

6. A photographic apparatus comprising:

a housing for defining a dark room, said housing having an opening for guiding light incident thereon from a predetermined optical system into said housing;

a shutter accommodated within said housing and placed in a first light path of the incident light;

a separator for separating a part of the incident light therefrom;

a moving mechanism accommodated within said housing and changing a position at which said separator is disposed, said moving mechanism setting said separator to at least one of a first position in the first light path of the incident light between said opening of said housing and said shutter and a second position deviated from the first light path of the incident light; and a photometric system accommodated within said housing and measuring an illuminance of an image formed by the predetermined optical system by using the separated light from said separator, said photometric system comprising:

a photosensor for detecting an intensity of the separated light from said photosensor;

a plurality of photometric optical systems for making the separated light form an image on a light receiving surface of said photosensor, said photometric optical systems having magnifications different from each other; and a switching mechanism for selectively setting one of said plurality of photometric optical systems into a second light path of the separated light between said separator set to the first position and said light receiving surface of said photosensor.

7. A photographic apparatus according to claim 6, wherein said shutter has a maximum opening area which is smaller than an imaging area attained when said incident light forms the image on the imaging surface.

8. A photographic apparatus according to claim 6, wherein said photosensor comprises a plurality of light intensity detectors constituting said light receiving surface of said photosensor, each of said light intensity detectors detecting, at an area corresponding thereto, the light intensity of the image formed on said light receiving surface of said photosensor.

9. A photographic apparatus according to claim 6, wherein said photometric system further comprises a control unit for determining a shutter speed of said shutter on the basis of light intensity information obtained from said photosensor and information about sensitivity of a photosensitive material disposed on the imaging surface.

10. A photographic apparatus according to claim 6, wherein each of said photometric optical systems has a reducing magnification.

11. A photographic apparatus according to claim 6, wherein a side wall of said housing is provided with an adapter for attaching thereto a finder optical system for observing an image to be formed by the predetermined optical system via said separator set to the first position.

* * * * *